United States Patent
Kim (10) Patent No.: US 9,869,877 B2
(45) Date of Patent: Jan. 16, 2018

(54) SWITCHABLE LENS DEVICE AND 2- AND 3-DIMENSIONAL IMAGE DISPLAY DEVICE USING THE SAME

(71) Applicant: LG DISPLAY CO., LTD., Seoul (KR)

(72) Inventor: Sungwoo Kim, Seoul (KR)

(73) Assignee: LG DISPLAY CO., LTD., Seoul (KR)

( * ) Notice: Subject to any disclaimer, the term of this patent is extended or adjusted under 35 U.S.C. 154(b) by 158 days.

(21) Appl. No.: 14/567,486

(22) Filed: Dec. 11, 2014

(65) Prior Publication Data

US 2015/0160467 A1 Jun. 11, 2015

(30) Foreign Application Priority Data

Dec. 11, 2013 (KR) .......................... 10-2013-0153756

(51) Int. Cl.
*G02F 1/1335* (2006.01)
*G02B 27/26* (2006.01)
*G02F 1/1333* (2006.01)

(52) U.S. Cl.
CPC ....... *G02B 27/26* (2013.01); *G02F 1/133526* (2013.01); *G02F 2001/133354* (2013.01)

(58) Field of Classification Search
CPC .. G02B 27/2214; G02B 27/26; G02B 3/0031; G02B 3/0056; G02B 3/005; G02B 3/0068; G02B 1/041; G02F 1/133526; G02F 2001/294; G02F 1/29; G02F 1/133354; G02F 2001/133354; H04N 13/0404; H04N 13/0454; H04N 13/0456; H04N 13/0406
USPC ............... 349/15, 200, 95, 57; 348/E13.029, 348/E13.044, 51, 59; 359/463, 619
See application file for complete search history.

(56) References Cited

U.S. PATENT DOCUMENTS

| | | | |
|---|---|---|---|
| 6,295,107 B1* | 9/2001 | Watanabe | G02F 1/133526 349/110 |
| 6,995,916 B2* | 2/2006 | Yamanaka | G02B 3/0031 359/619 |
| 8,179,425 B2* | 5/2012 | Harrold | G02F 1/1333 348/42 |
| 2004/0100598 A1* | 5/2004 | Adachi | G02F 1/133536 349/113 |
| 2004/0169920 A1* | 9/2004 | Uehara | G02B 27/2214 359/443 |
| 2004/0246405 A1* | 12/2004 | Faris | G02B 5/3016 349/90 |

(Continued)

FOREIGN PATENT DOCUMENTS

| | | |
|---|---|---|
| CN | 101349770 A | 1/2001 |
| CN | 1888958 A | 1/2007 |
| CN | 102265192 A | 11/2011 |
| CN | 102313922 A | 1/2012 |
| KR | 10-2013-0064333 A | 6/2013 |

*Primary Examiner* — Edward Glick
*Assistant Examiner* — Shan Liu
(74) *Attorney, Agent, or Firm* — Dentons US LLP (57) ABSTRACT

Disclosed is a display device that may include a display panel; and a switchable lens device on the display panel, wherein the switchable lens device comprises, a first substrate, a first lens layer having a first refractive index in a first direction and a second refractive index lower than the first refractive index in a second direction substantially perpendicular to the first direction, and having a plurality of convex surfaces, and a second lens layer between the first substrate and the first lens layer, the second lens layer having substantially the same refractive index as the first refractive index.

19 Claims, 6 Drawing Sheets

(56) References Cited

U.S. PATENT DOCUMENTS

| | | | | |
|---|---|---|---|---|
| 2006/0290874 A1* | 12/2006 | Yoon | ............... | G02F 1/133528 349/158 |
| 2007/0008620 A1* | 1/2007 | Shestak | ............... | G02B 3/14 359/463 |
| 2007/0019132 A1* | 1/2007 | Kim | ............... | B29C 43/021 349/95 |
| 2007/0296896 A1* | 12/2007 | Hong | ............... | G02B 27/2214 349/122 |
| 2009/0116116 A1* | 5/2009 | Tomikawa | ............... | G02B 27/2214 359/619 |
| 2011/0036612 A1* | 2/2011 | Jung | ............... | G02F 1/133308 174/50.5 |
| 2011/0242442 A1* | 10/2011 | Lee | ............... | G02B 27/26 349/15 |
| 2011/0255018 A1* | 10/2011 | Roh | ............... | G02B 27/26 349/15 |
| 2012/0162763 A1* | 6/2012 | Son | ............... | G02B 27/2214 359/463 |
| 2012/0164345 A1* | 6/2012 | Lee | ............... | G02B 5/3083 427/542 |
| 2013/0222719 A1* | 8/2013 | Matsumoto | ............... | H04N 13/0409 349/15 |
| 2013/0309411 A1* | 11/2013 | Kuwana | ............... | G02B 1/04 427/510 |
| 2014/0073214 A1* | 3/2014 | Wu | ............... | G02B 26/08 445/24 |
| 2015/0103338 A1* | 4/2015 | Kim | ............... | H01L 51/5275 356/237.1 |

* cited by examiner

SWITCHABLE LENS DEVICE AND 2- AND 3-DIMENSIONAL IMAGE DISPLAY DEVICE USING THE SAME

This application claims the benefit of Korean Patent Application No. 10-2013-0153756 filed on Dec. 11, 2013, which is hereby incorporated by reference for all purposes as if fully set forth herein.

BACKGROUND OF THE INVENTION

Field of the Invention

The present invention relates to a display device and method of manufacturing the same, and more particularly, to a display device including a switchable lens device.

Discussion of the Related Art

Stereoscopic image displays can be classified into glasses type and non-glasses type depending on whether the viewer needs to wear special glasses to separate left and right images.

In a typical example of the glasses type, left and right images are spatially, separately displayed, or left and right images are dividedly displayed in a time-division manner. However, the glasses type requires the viewer to wear glasses when watching 3D images.

Due to this inconvenience of the viewer wearing glasses, the non-glasses type stereoscopic image displays have been developed in recent years. The non-glasses type generally has an optical element, such as a parallax barrier and a lenticular lens, for separating optical axes of the left eye image and the right eye image, which is disposed in front of or behind a display screen, thereby implementing a 3D image.

However, such a conventional non-glasses type stereoscopic image display device displays only 3D images but not 2D images.

SUMMARY OF THE INVENTION

Accordingly, the present invention is directed to a display device including a switchable lens device and method of manufacturing the same that substantially obviates one or more of the problems due to limitations and disadvantages of the related art.

An advantage of the present invention is to provide a display device including a switchable lens device capable of displaying both 2D and 3D images.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, a display device may, for example, include a display panel; and a switchable lens device on the display panel, wherein the switchable lens device comprises, a first substrate, a first lens layer having a first refractive index in a first direction and a second refractive index lower than the first refractive index in a second direction substantially perpendicular to the first direction, and having a plurality of convex surfaces, and a second lens layer between the first substrate and the first lens layer, the second lens layer having substantially the same refractive index as the first refractive index.

In another aspect of the present invention, a 2D/3D image display device may, for example, include a display panel that displays an image using light linearly polarized in a first direction; a polarization control unit that selectively switches light of the first direction to light linearly polarized in a second direction substantially orthogonal to the first direction; and a switchable lens device that refracts light incident from the polarization control unit using a refractive index difference and separates the refracted light into light for a left eye image and light for a right eye image to represent a 3D image, or transmits the light incident from the polarization control unit without refraction to represent a 2D image, wherein the switchable lens devices includes a first film, a first lens layer and a second lens layer.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE ILLUSTRATED EMBODIMENTS

Reference will now be made in detail to embodiments of the present invention, examples of which are illustrated in the accompanying drawings. The same reference numbers may be used throughout this disclosure including the drawings to refer to the same or like parts. Also, detailed descriptions of well-known elements, functions or configurations may be omitted.

A 2D/3D image display device according to the first exemplary embodiment of the present invention will be described with reference to FIG. 1.

Figure 1:
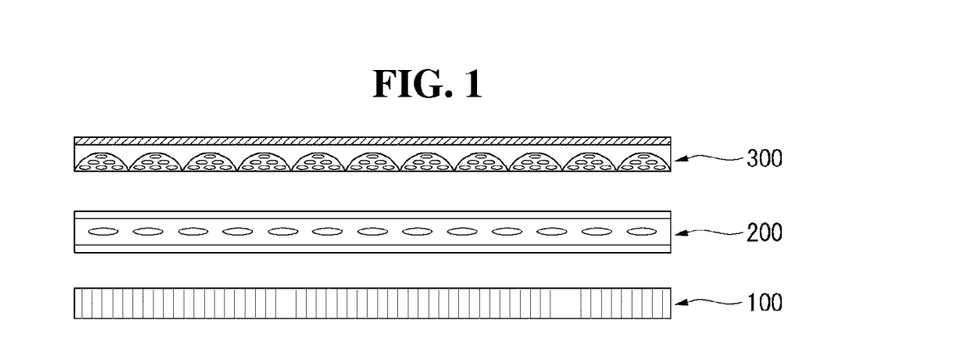
FIG. 1 is a cross-sectional view illustrating a schematic configuration of a 2D/3D image display device according to the first exemplary embodiment of the present invention.

FIG. 1 is a cross-sectional view illustrating a schematic configuration of a 2D/3D image display device according to the first exemplary embodiment of the present invention.

The 2D/3D image display device includes a display panel 100, which is a display device that displays 2D and 3D image data. The display panel 100 may be one of flat panel displays, such as a liquid crystal display (LCD), a field emission display (FED), a plasma display panel (PDP), an inorganic electroluminescence display, an electroluminescence (EL) display including an organic light emitting diode (OLED) display and an inorganic light emitting diode display, and an electrophoresis display (EPD). The following description will be given by taking an example where the display panel 100 is an LCD.

The display panel 100 includes a thin film transistor (TFT) substrate on which a pixel array including TFTs is formed, a color filter substrate on which color filters for displaying colors are formed, and a liquid crystal layer disposed between the TFT substrate and the color filter substrate. Polarizing plates, of which light absorption axes are substantially perpendicular to each other, are respectively attached to the surfaces of the TFT substrate and the color filter substrate of the display panel 100. Hence, light incident on the display panel 100 in either a horizontal or vertical direction is linearly polarized in a direction about 90° to the light absorption axis of the incident light and then comes out of the display panel 100.

A polarization control unit 200 is disposed on the display panel 100. The polarization control unit 200 transmits the light supplied from the display panel 100 without refraction, or linearly polarizes the light by about 90° and then supplies the light to a switchable lens device 300. The polarization control unit 200 may be applied to a liquid crystal panel driven in a twisted nematic (TN) mode, a vertical alignment (VA) mode, an in-plane switching (IPS) mode, and a fringe field switching (FFS) mode.

The switchable lens device 300 is disposed on the polarization control unit 200. The switchable lens device 300 transmits the light supplied from the polarization control unit 200 without changing a state of the light to display a 2D image, or separates the light into light corresponding to a right eye image and light corresponding to a left eye image to display a 3D image, depending on a polarization direction of the light supplied from the polarization control unit 200.

An exemplary configuration and operation of the polarization control unit 200 will now be described with reference to FIGS. 2, 3A, and 3B.

Figure 2:
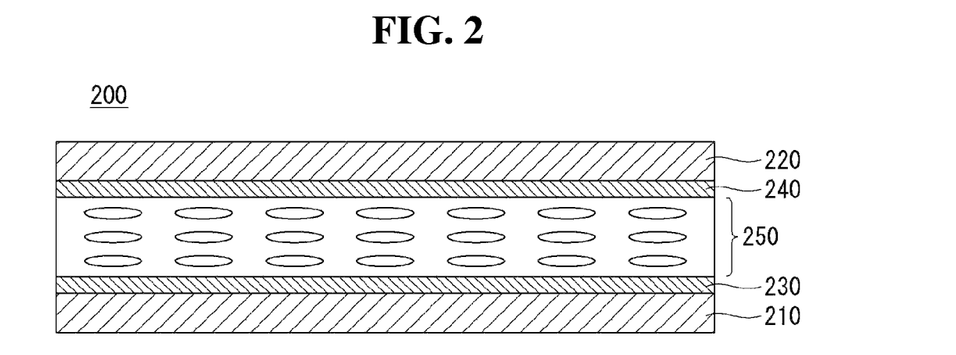
FIG. 2 is a cross-sectional view illustrating a polarization control unit configured as a TN mode liquid crystal panel.

FIG. 2 is a cross-sectional view illustrating a configuration of the polarization control unit 200 configured with a TN mode liquid crystal panel. FIGS. 3A and 3B are cross-sectional views illustrating a polarization direction of light depending on an operation state of the polarization control unit 200 illustrated in FIG. 2.

Referring to FIG. 2, the polarization control unit 200 includes a first electrode 230 formed on a first substrate 210 (corresponding to a lower substrate in FIG. 2), a second electrode 240, which is positioned opposite the first electrode 230 and formed on a second substrate 220 (corresponding to an upper substrate in FIG. 2), and a liquid crystal layer 250 disposed between the first electrode 230 and the second electrode 240.

Each of the first substrate 210 and the second substrate 220 may be formed of glass or transparent plastic material.

Each of the first electrode 230 and the second electrode 240 may be formed of a transparent conductive material such as indium tin oxide (ITO), indium zinc oxide (IZO), gallium-doped zinc oxide (GZO), and the like.

Liquid crystal molecules constituting the liquid crystal layer 250 may be formed of positive liquid crystals. The positive liquid crystals are liquid crystals defined by $\Delta\in>0$, where the dielectric constant ($\in\|$) of the liquid crystal molecules along the long axis is greater than the dielectric constant ($\in\perp$) of the liquid crystal molecules along the short axis. The positive liquid crystals are arranged between alignment layers (not shown) that are respectively attached to the first electrode 230 and the second electrode 240 and are pre-tilted.

Figure 3A:
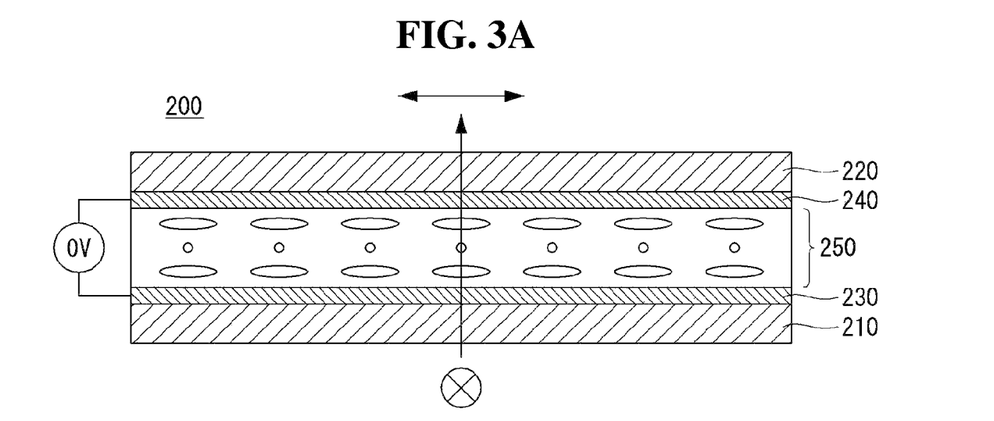
FIGS. 3A and 3B are cross-sectional views illustrating a polarization direction of light depending on an operation state of the polarization control unit illustrated in FIG. 2.
Figure 3B:
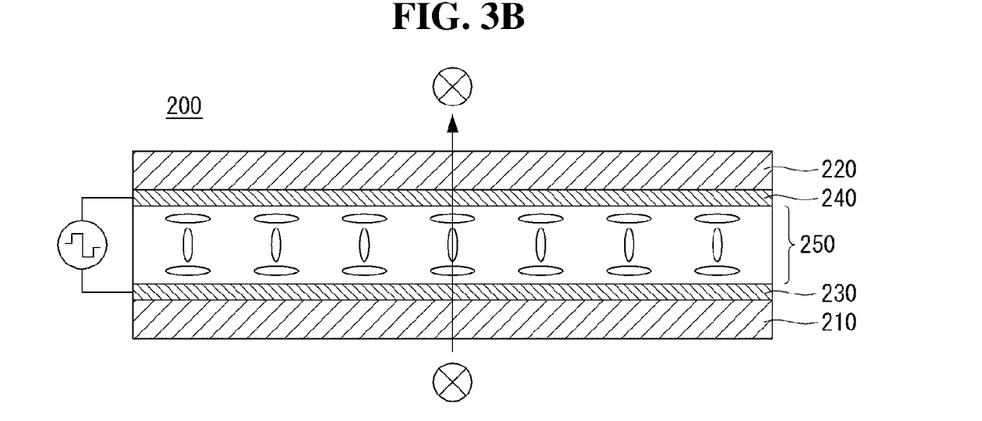

As illustrated in FIG. 3A, when an electric field is not applied to the liquid crystal layer 250 in TN mode, the liquid crystal molecules are arranged so that the direction of linear polarization of the incident light is rotated by about 90°, changing from a vertical linear polarization (indicated by $\otimes$) to a horizontal linear polarization (indicated by $\leftrightarrow$). On the other hand, as illustrated in FIG. 3B, when an electric field is applied to the liquid crystal layer 250, the liquid crystal molecules are arranged so that the incident light passes through them substantially without refraction.

In other words, as illustrated in FIG. 3A, when an electric field is not applied to the liquid crystal layer 250, the polarization control unit 200 transmits linearly polarized light whose polarization axis is converted from a vertical direction $\otimes$ into a horizontal direction $\leftrightarrow$. On the other hand, as illustrated in FIG. 3B, when an electric field is applied to the liquid crystal layer 250, the polarization control unit 200 transmits light whose polarization axis is a vertical direction $\otimes$ substantially without refraction.

Figure 4:
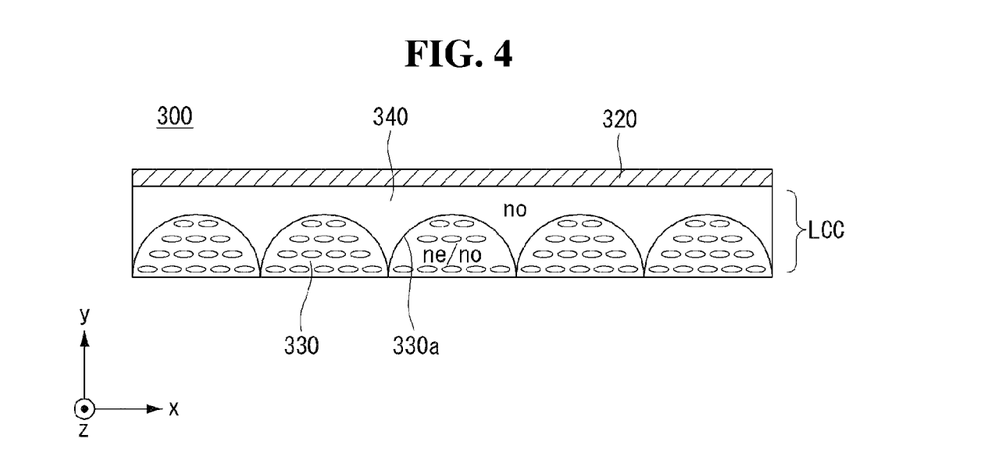
FIG. 4 is a cross-sectional view illustrating a switchable lens device of the 2D/3D image display device illustrated in FIG. 1 according to the first exemplary embodiment of the present invention.

The switchable lens device 300 will now be described with reference to FIG. 4. FIG. 4 is a cross-sectional view illustrating a switchable lens device of an 2D/3D image display device according to an embodiment of the present invention.

As illustrated in FIG. 4, the switchable lens device 300 includes a first film 320 and a lens cell LCC provided on one surface of the first film 320. The lens cell LCC includes a first lens layer 330 having convex surfaces 330a and a second lens layer 340 provided between the convex surfaces 330a of the first lens layer.

The first film 320 may be formed of a material that has a low retardation of about 100 nm or less and is substantially isotropic with uniaxial characteristics. The first film 320 may be selected from the group including polyethylene terephthalate (PET), triacetyl cellulose (TAC), and polycarbonate (PC).

The first lens layer 330 of the lens cell LCC may be formed by curing photo-curable liquid crystals in a state where the UV-curable liquid crystals are orientated in a vertical direction (z-axis direction in FIG. 4), and has successive convex surfaces 330a. Thus, the liquid crystals constituting the first lens layer 330 are fixedly orientated in the vertical direction at all positions. More specifically, molecules of the photo-curable liquid crystals, such as reactive mesogen, form a network by a light reaction and may maintain an initial orientation state of liquid crystal molecules. Thus, when a polarized UV ray is irradiated onto the photo-curable liquid crystals, the photo-curable liquid crystals are cured while maintaining the initial orientation state in conformity with the polarized UV ray.

The first lens layer 330 of the lens cell LCC has a first refractive index 'ne' and a second refractive index 'no' depending on the direction of the liquid crystal molecules because of refractive index anisotropy of the liquid crystal molecules. More specifically, the first lens layer 330 has the first refractive index 'ne' in the long axis direction of the liquid crystal molecules, but has the second refractive index 'no', which is smaller than the first refractive index 'ne', in the short axis direction of the liquid crystal molecules. Because the short axis of the liquid crystal molecules of the first lens layer 330 of the lens cell LCC is oriented in the vertical direction (z-axis direction in FIG. 4), the first lens layer 330 has the second refractive index 'no' in the vertical direction. Further, because the long axis of the liquid crystal molecules of the first lens layer 330 of the lens cell LCC is oriented in the horizontal direction (x-axis direction in FIG. 4), the first lens layer 330 has the first refractive index 'ne' in the horizontal direction.

The second lens layer 340 is provided between the first lens layer 330 and the first film 320 so as to flatly cover the convex surfaces 330a of the first lens layer 330. The second lens layer 340 may be formed of a transparent photo-curable resin that has substantially the same refractive index 'no' as the refractive index 'no' of the first lens layer 330 along the short axis.

Figure 5:
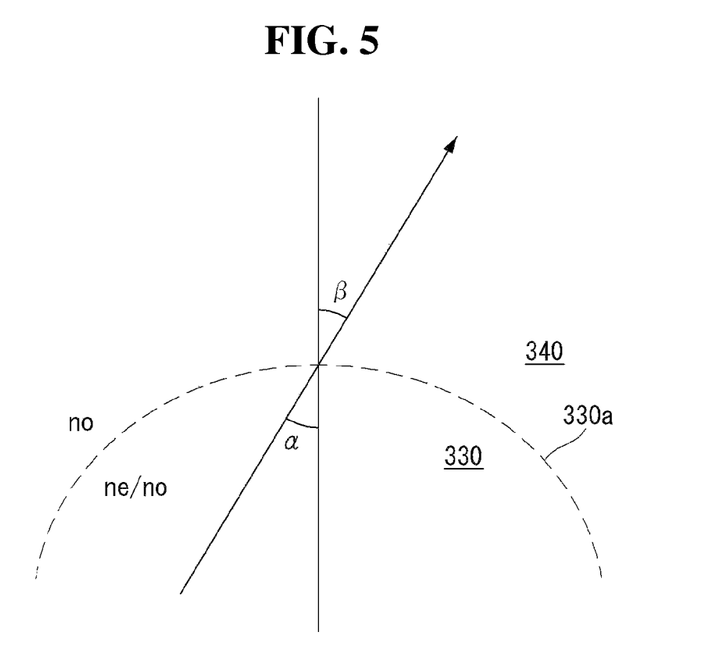
FIG. 5 is a view for explaining a condition in which a switchable lens device converges light to a focal point.

FIG. 5 is a view for explaining a condition in which the switchable lens device 300 converges light to a focal point. To display a 3D image, the switchable lens device 300 divides the incident light into a light for a left eye image and a light for a right eye image and converges the light for the left eye image and the light for the right eye image to a focal point.

As described above, the first lens layer 330 has the first refractive index 'ne' and the second refractive index 'no' depending on the direction of polarization of light, and the second lens layer 340 has the second refractive index 'no'.

According to Snell's law, when light passes through two different media each having a different refractive index, the incident angle α and the refractive angle β have a relationship of ne·sin α=no·sin β at the boundary between the two media. However, because the second refractive index 'no' is less than the first refractive index 'ne', the incident angle α must be greater than the refractive angle β. Thus, the boundary between the first lens layer 330 and the second lens layer 340 has to form a convex surface 330a to converge the light to a focal point. On the contrary, when the boundary between the first lens layer 330 and the second lens layer 340 forms a concave surface, the light is not converged to a focal point. Hence, the light for the left eye image and the light for the right eye image may not be separated.

A process for displaying 2D and 3D images through the 2D/3D image display device according to the first exemplary embodiment of the present invention will now be described with reference to FIG. 6.

Figure 6:
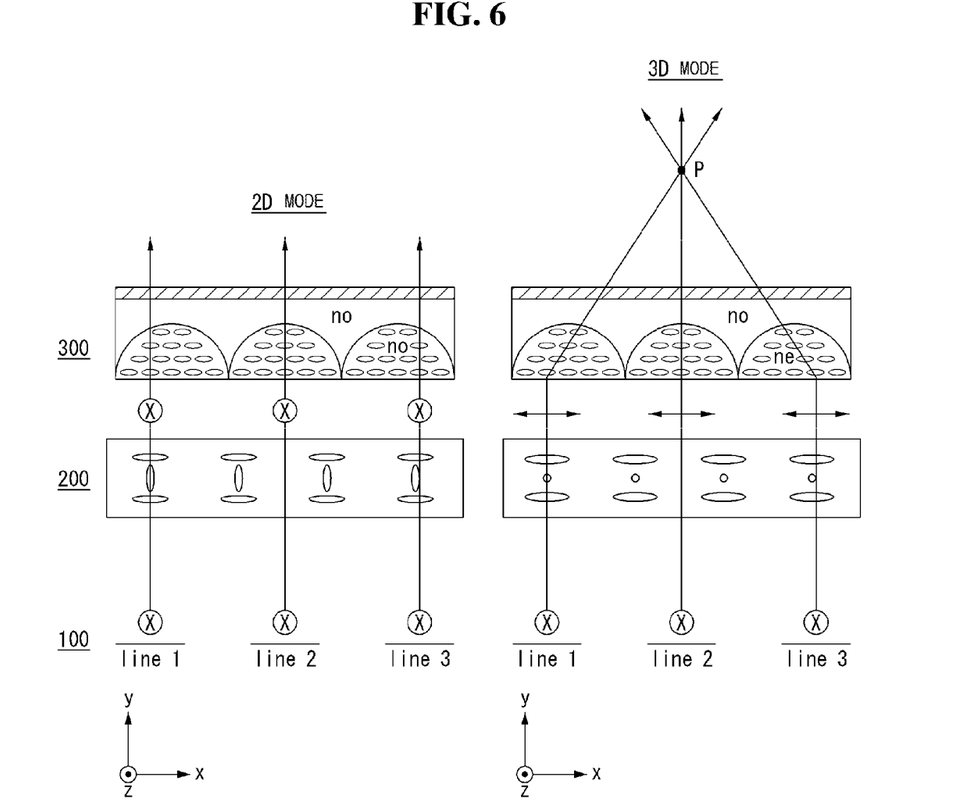
FIG. 6 is a view for explaining a principle of displaying 2D and 3D images through the 2D/3D image display device according to the first exemplary embodiment of the present invention.

FIG. 6 is a view for explaining a principle of displaying of 2D and 3D images through the 2D/3D image display device according to the first exemplary embodiment of the present invention. For brevity, FIG. 6 illustrates that the switchable lens device 300 is disposed corresponding to pixels on three lines of the display panel 100.

In the 3D image mode, when the light emitted from the display panel 100 passes through the polarization control unit 200 to which an electric field is not applied, the polarization axis of the light is rotated by about 90° from a vertical direction (x) (z-axis direction in FIG. 6) to a horizontal direction ↔ (x-axis direction in FIG. 6). Hence, a light whose polarization axis is horizontal ↔ is supplied to the switchable lens device 300.

Because the liquid crystal molecules constituting the first lens layer 330 of the lens cell LCC of the switchable lens device 300 are orientated in the horizontal direction, the polarization direction of the light is the same as the long axis direction of the liquid crystal molecules. Thus, the first lens layer 330 functions as a layer having the first refractive index 'ne', and the second lens layer 340 functions as a layer having the second refractive index 'no'. According to Snell's law, light is refracted by the convex surfaces 330a of the first lens layer 330 and converged to a focal point 'p'. As a result, as the light passes through the switchable lens device 300, the light is split into two rays that travel along a path of light corresponding to the right eye image and a path of light corresponding to the left eye image and are then converged to different focal points (left and right eyes of the viewer), thereby displaying a 3D image.

In the 2D image mode, when the light emitted from the display panel 100 passes through the polarization control unit 200 to which an electric field is applied, the light passes through the polarization control unit 200 substantially without changing the polarization axis. Thus, the polarization axis of light is vertical (x) (z-axis direction in FIG. 6) both before and after the light passes through the polarization control unit 200. As a result, a light whose polarization axis is vertical (x) is supplied to the switchable lens device 300.

Because the liquid crystal molecules of the first lens layer 330 of the lens cell LCC of the switchable lens device 300 are orientated in the vertical direction, the polarization direction of the incident light is the same as the short axis direction of the liquid crystal molecules. Thus, the first lens layer 330 functions as a layer having the second refractive index 'no', and the second lens layer 340 also functions as a layer having the second refractive index 'no'. As a result, the light may not be refracted by the switchable lens device 300 and may pass through the switchable lens device 300 substantially without refraction, thereby displaying a 2D image.

The switchable lens device 300 and the 2D/3D image display device according to the first exemplary embodiment of the present invention allow for displaying 2D/3D images in a non-glasses manner, because the lens cell LCC of the switchable lens device 300 includes a first lens layer having two different refractive indices and a second lens layer having one refractive index.

A 2D/3D image display device according to the second exemplary embodiment of the present invention will now be described with reference to FIG. 7.

Figure 7:
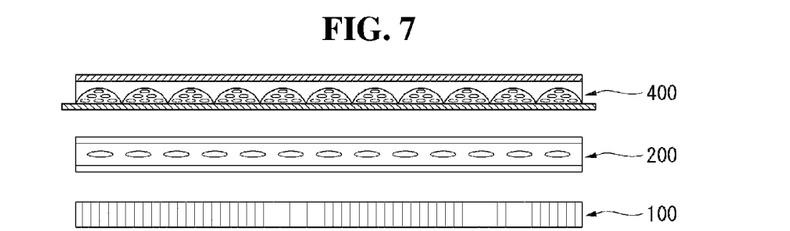
FIG. 7 is a cross-sectional view illustrating a schematic configuration of a 2D/3D image display device according to the second exemplary embodiment of the present invention.

FIG. 7 is a cross-sectional view illustrating a schematic configuration of a 2D/3D image display device according to the second exemplary embodiment of the present invention.

Referring to FIG. 7, the 2D/3D image display device according to the second exemplary embodiment of the present invention includes a display panel 100, a polarization control unit 200, and a switchable lens device 400. The display panel 100, the polarization control unit 200, and the switchable lens device 400 are provided along a travelling path of light.

The 2D/3D image display device according to the second exemplary embodiment is substantially identical to that of the first exemplary embodiment, except for the switchable lens device 400. Thus, the switchable lens device 400 will now be described in detail with reference to FIGS. 8A and 8B.

Figure 8A:
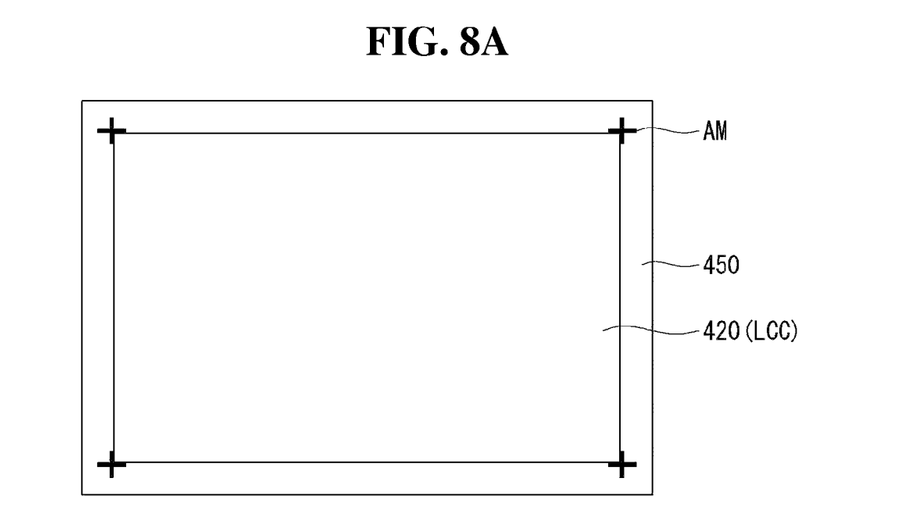
FIG. 8A is a top-plan view illustrating a switchable lens device of the 2D/3D image display device according to the second exemplary embodiment of the present invention.
Figure 8B:
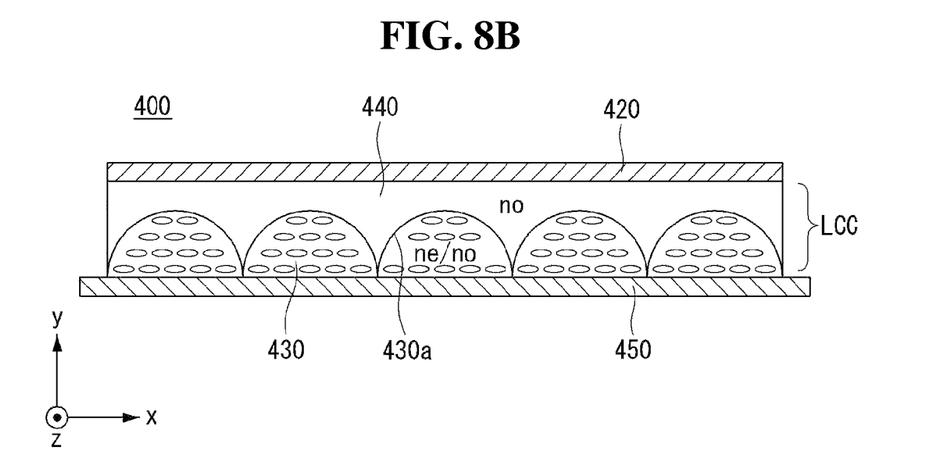
FIG. 8B is a cross-sectional view illustrating the switchable lens device of the 2D/3D image display device illustrated in FIG. 7 according to the second exemplary embodiment of the present invention.

FIG. 8A is a top-plan view illustrating a switchable lens device of the 2D/3D image display device according to the second exemplary embodiment of the present invention, and FIG. 8B is a cross-sectional view illustrating the switchable lens device of the 2D/3D image display device illustrated in FIG. 7 according to the second exemplary embodiment of the present invention.

Referring to FIGS. 8A and 8B, the switchable lens device 400 includes a first film 420, a second film 450, and a lens cell LCC disposed between the first and second films 420 and 450. The lens cell LCC includes a first lens layer 430 provided on the second film 450 and having convex surfaces 430a and a second lens layer 440 provided on the first film 420 and having concave surfaces corresponding to the convex surfaces 430.

The first film 420 may be selected from a group including polyethylene terephthalate (PET), triacetyl cellulose (TAC), and polycarbonate (PC).

The second film 450, which is larger in size than the display panel 100 and polarization control unit 200 that are positioned under the second film 450, has alignment marks AM formed at the positions substantially corresponding to corners of the display panel 100.

The second film 450 may be formed of a material that has a low retardation of about 100 nm or less and is substantially isotropic and uniaxial characteristics. The second film 450 may be selected from the group including polyethylene terephthalate (PET), triacetyl cellulose (TAC), and polycarbonate (PC).

The second film 450 may serve to secure a space when the display panel 100 and the polarization control unit 200 are attached together. Thus, an additional means for securing the space from the display panel 100 and the polarization control unit 200 to the switchable lens device 400 may not be necessary.

Further, because the second film 450 has no or small retardation, the light emitted from the display panel 100 may not be retarded. As a result, the second film 450 may reduce or prevent a 3D crosstalk.

The first film 410 may be formed of the same material as the second film 450. Alternatively, the first film 410 may be formed of a different material from the first film 310.

The lens cell LCC of the switchable lens device 400 according to the second exemplary embodiment of the present invention includes a first lens layer 430 having convex portions 430a and having first and second refractive indices 'ne/no' and a second lens layer 440 having concave portions corresponding to the convex portions 430a and having the first refractive index 'ne'. The lens cell LCC constituting the switchable lens device 400 according to the second exemplary embodiment is substantially the same as the lens cell LCC of the switchable lens device 300 according to the first exemplary embodiment. Thus, a detailed description thereof will be omitted.

A process for displaying 2D and 3D images through the 2D/3D image display device according to the second exemplary embodiment of the present invention will now be described with reference to FIG. 9.

Figure 9:
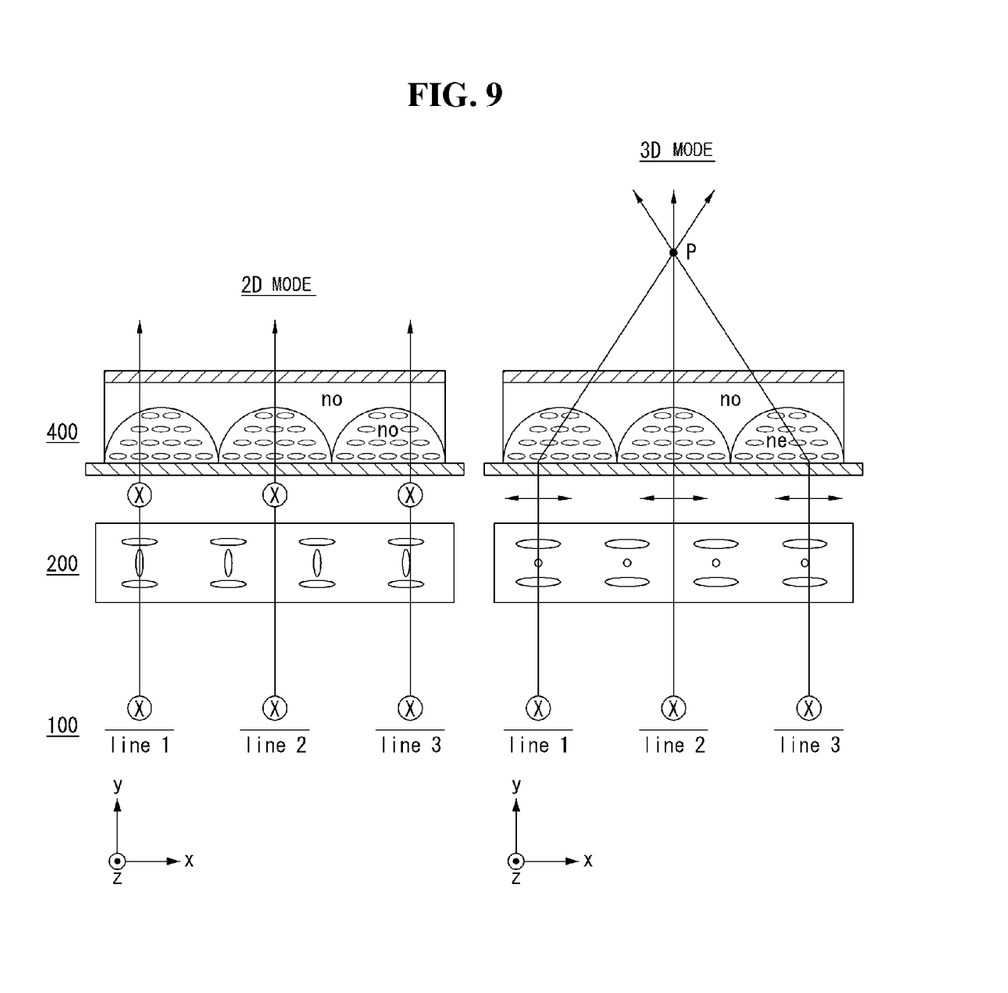
FIG. 9 is a view for explaining a principle of displaying 2D and 3D images through the 2D/3D image display device according to the second exemplary embodiment of the present invention.

FIG. 9 is a view for explaining a principle of displaying 2D and 3D images through the 2D/3D image display device according to the second exemplary embodiment of the present invention. For brevity, FIG. 9 illustrates that the switchable lens device 400 is disposed corresponding to pixels on three lines of the display panel 100.

In the 3D image mode, when the light emitted from the display panel 100 passes through the polarization control unit 200 to which an electric field is not applied, the polarization axis is rotated by about 90° from a vertical direction $\odot$ (z-axis direction in FIG. 9) to a horizontal direction ↔ (x-axis direction in FIG. 9). Hence, a light whose polarization axis is horizontal ↔ is supplied to the switchable lens device 400.

Because the liquid crystal molecules constituting the first lens layer 430 of the lens cell LCC of the switchable lens device 400 are orientated in the horizontal direction, the polarization direction of the incident light is the same as the long axis direction of the liquid crystal molecules. Thus, the first lens layer 430 functions as a layer having the first refractive index 'ne', and the second lens layer 440 functions as a layer having the second refractive index 'no'. According to Snell's law, light is refracted by the convex surfaces 430a of the first lens layer 430 and converged to a focal point 'p'. As a result, as the light passes through the switchable lens device 400, the light is split into two rays that travel along a path of light corresponding to the right eye image and a path of light corresponding to the left eye image and are then converged to different focal points (left and right eyes of the viewer), thereby displaying a 3D image.

In the 2D image mode, when the light emitted from the display panel 100 passes through the polarization control unit 200 to which an electric field is applied, the light passes through the polarization control unit 200 substantially without changing the polarization axis. Thus, the polarization axis of light is vertical $\odot$ (z-axis direction in FIG. 9) both before and after the light passes through the polarization control unit 200. As a result, a light whose polarization axis is vertical $\odot$ is supplied to the switchable lens device 400.

Because the liquid crystal molecules of the first lens layer 430 of the lens cell LCC of the switchable lens device 400 are orientated in the vertical direction, the polarization direction of the incident light is the same as the short axis direction of the liquid crystal molecules. Thus, the first lens layer 430 functions as a layer having the second refractive index 'no', and the second lens layer 440 also functions as a layer having the second refractive index 'no'. As a result, the light may not refracted by the switchable lens device 400 and may pass through the switchable lens device 400 substantially without refraction, thereby displaying a 2D image.

According to the switchable lens device and the 2D/3D image display device described above according to the second exemplary embodiment of the present invention, the second film having a low retardation may eliminate the need for an additional means for securing a space when the display panel and the polarization control unit are attached together. Also, because the second film has no or small retardation, retardation of the light emitted from the display panel 100 may be reduced or prevented, thereby reducing or preventing a 3D crosstalk. Moreover, the second film 450 allows for more precise attachment of the display panel and the polarization control unit by using alignment marks formed thereon.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:
1. A display device comprising:
a display panel; and
a switchable lens device on the display panel, wherein the switchable lens device comprises,
a first film,
a first lens layer having a first refractive index in a first direction and a second refractive index lower than the first refractive index in a second direction substantially perpendicular to the first direction, and having a plurality of convex surfaces, a second lens layer between the first film and the first lens layer, the second lens layer having substantially the same refractive index as the second refractive index, and a second film on the first lens layer;

wherein the second film of the switchable lens device is larger in size than the first film and the first and second lens layers and the display panel, and comprises alignment marks outside the first and second lens layers aligned with corners of the display panel, and wherein the second film comprises a material having isotropic and uniaxial characteristics.

2. The display device of claim 1, wherein the second lens layer has a plurality of concave surfaces substantially corresponding to the plurality of convex surfaces of the first lens layer.

3. The display device of claim 2, wherein the second lens layer planarizes the plurality of convex surfaces of the first lens layer.

4. The display device of claim 1, wherein the first lens layer includes a photo-curable liquid crystal material including reactive mesogen.

5. The display device of claim 4, wherein the second lens layer is formed of a photo-curable resin.

6. The display device of claim 1, further comprising a polarization control unit between the display panel and the switchable lens device.

7. The display device of claim 6, wherein the polarization control unit includes a first electrode, a second electrode, and a liquid crystal having a positive anisotropy between the first and second electrodes.

8. The display device of claim 6, wherein the polarization control unit changes a polarization state of a light emitted from the display panel to display a 3D image.

9. The display device of claim 8, wherein the polarization state of the light emitted from the display panel is changed by about 90 degrees by the polarization control unit.

10. The display device of claim 9, wherein the polarization state of the light emitted from the display panel and output from the polarization control unit is substantially the same as the first direction of the first lens layer.

11. The display device of claim 9, wherein the light emitted from the display panel and output from the polarization control unit and the switchable lens device converges to a focal point outside the display device by the plurality of convex surfaces of the first lens layer.

12. The display device of claim 6, wherein a light emitted from the display panel passes through the polarization control unit substantially without its polarization state being changed to display a 2D image.

13. The display device of claim 12, wherein the polarization control unit has a first electrode, a second electrode, and a liquid crystal between the first and second electrodes, and an electric field is applied to the liquid crystal to display the 2D image.

14. The display device of claim 12, wherein the polarization state of the light emitted from the display panel and output from the polarization control unit is substantially the same as the second direction of the first lens layer.

15. The device of claim 1, wherein the first lens layer includes a liquid crystal material cured by a polarized UV ray in a direction of the polarized UV ray.

16. The device of claim 1, wherein the second film comprises a material having a low retardation of about 100 nm or less.

17. The device of claim 1, wherein the second film comprises polyethylene terephthalate (PET), triacetyl cellulose (TAC), or polycarbonate (PC).

18. A 2D/3D image display device comprising:

a display panel that displays an image using light linearly polarized in a first direction;

a polarization control unit that selectively switches light of the first direction to light linearly polarized in a second direction substantially orthogonal to the first direction; and a switchable lens device that refracts light incident from the polarization control unit using a refractive index difference and separates the refracted light into light for a left eye image and light for a right eye image to represent a 3D image, or transmits the light incident from the polarization control unit without refraction to represent a 2D image, wherein the switchable lens devices includes a first film, a first lens layer, a second lens layer and a second film on a first surface of the first lens layer, wherein the second film of the switchable lens device is larger in size than the first film and the first and second lens layers and the display panel, and comprises alignment marks outside the first and second lens layers aligned with corners of the display panel, and wherein the second film comprises a material having isotropic and uniaxial characteristics.

19. The 2D/3D image display device of claim 18, wherein the first lens layer is formed of a photo-curable liquid crystal material including reactive mesogen, having refractive index anisotropy, and the second lens layer is formed of a photo-curable resin.

* * * * *